United States Patent
Singh et al.

(10) Patent No.: US 7,113,079 B2
(45) Date of Patent: Sep. 26, 2006

(54) SYSTEM AND METHOD FOR DETECTING A COLLISION USING A CONTINUOUS MODE HIDDEN MARKOV MODEL

(75) Inventors: Gautam B. Singh, Rochester, MI (US); Haiping Song, Rochester, MI (US)

(73) Assignee: Oakland University, Rochester, MI (US)

( * ) Notice: Subject to any disclaimer, the term of this patent is extended or adjusted under 35 U.S.C. 154(b) by 225 days.

(21) Appl. No.: 10/958,028

(22) Filed: Oct. 4, 2004

(65) Prior Publication Data

US 2005/0096817 A1    May 5, 2005

Related U.S. Application Data

(60) Provisional application No. 60/515,033, filed on Oct. 28, 2003.

(51) Int. Cl.
*B60Q 1/00* (2006.01)
*B60K 28/10* (2006.01)

(52) U.S. Cl. ............. 340/436; 180/274; 701/300
(58) Field of Classification Search ......... 340/436
See application file for complete search history.

(56) References Cited

U.S. PATENT DOCUMENTS

| | | | |
|---|---|---|---|
| 2003/0040859 A1* | 2/2003 | Farmer ................ | 701/45 |
| 2003/0169340 A1* | 9/2003 | Kamijo et al. ......... | 348/169 |
| 2004/0153229 A1* | 8/2004 | Gokturk et al. ........ | 701/45 |
| 2005/0073136 A1* | 4/2005 | Larsson et al. ........ | 280/735 |
| 2005/0179580 A1* | 8/2005 | Cong et al. ........... | 342/70 |
| 2005/0285939 A1* | 12/2005 | Kamijo et al. ......... | 348/149 |

\* cited by examiner

*Primary Examiner*—Daniel Wu
*Assistant Examiner*—George A. Bugg
(74) *Attorney, Agent, or Firm*—Howard & Howard

(57) ABSTRACT

A system and method detects a crash of a motor vehicle. A parameter of the motor vehicle is sensed and a continuous signal is responsively generated. A crash is detected as a function of the continuous signal and a hidden Markov model operating in a continuous mode.

30 Claims, 3 Drawing Sheets

SYSTEM AND METHOD FOR DETECTING A COLLISION USING A CONTINUOUS MODE HIDDEN MARKOV MODEL

This application claim priority to U.S. Provisional Application Ser. No. 60/515,033 filed Oct. 28, 2003.

FIELD OF THE INVENTION

The present invention relates generally to detecting collisions, and more particularly, to a system and method for detecting collisions using a continuous mode hidden Markov model.

BACKGROUND OF THE INVENTION

For many buyers of motor vehicles, safety features are an important factor in the purchasing decision, i.e., crashworthiness of a motor vehicle plays an important role in establishing the quality of the motor vehicle, and thus, customer acceptance. Governmental regulations applicably to vehicle restraint systems requires robust restraint systems able to detect and protect a wide range of occupants in a variety of crash types. The automobile industry has come a long way in providing "smart" restraint systems. However, the current crash detection techniques are based on multistage sequential signal analysis algorithms and are generally tunes to detect specific types of crash events. The early detection of crash-events allows the parameters of vehicle restraint systems to be more accurately adjusted. Such parameters includes, but are not limited to, airbag inflation rates and pressures, and belt pre-tensioning systems.

The current crash sensing algorithms can be divided into two categories—speed dependent and crush dependent.

Speed dependent algorithms are based on variables related to speed, such as changes in speed (acceleration), jerk, speed, displacement, and/or energy.

Crush dependent algorithms use crush to predict the severity of the crash. Typically, there are one or more sensors mounted in the crush zone.

Furthermore, certain types of crashes pose other problems. For example, in the case of side impacts the space between the passenger(s) and side panels of the vehicles are much smaller and, thus, the required time to initiate the airbag are also much smaller.

To accommodate all of the different types of crashes, these algorithms are necessarily becoming more and more complex. Thus, the time involved in detecting a crash also increases which limits the effectiveness of the vehicle restraint system(s).

The present invention is aimed at one or more of the problems as set forth above.

SUMMARY OF THE INVENTION

In one aspect of the present invention, a system for detecting a crash of a motor vehicle, is provided. The system includes at least one sensor and a controller. The at least one sensor senses a parameter of the motor vehicle and generates a continuous signal as a function of the sensed parameter. The controller implements a hidden Markov model operating in a continuous mode, receives the continuous signal and detects a crash of the motor as a function of the continuous signal and the hidden Markov model.

In another aspect of the present invention, a method for detecting a crash of a motor vehicle is provided. The method includes the steps of sensing a parameter of the motor vehicle, generating a continuous signal as a function of the sensed parameter, and detecting a crash of the motor as a function of the continuous signal and a hidden Markov model operating in a continuous mode.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

With reference to the drawings an in operation, a system 10 and method detects a crash of a motor vehicle 12. The system 10 includes at least one sensor 14 and a controller 16. The sensor 14 senses a parameter of the motor vehicle 12 and generates a continuous signal as a function of the sensed parameter. For example, the at least one sensor 14 may be an accelerometer for sensing acceleration of the motor vehicle 12.

The controller 16 includes a processor, such as a microprocessor or microcontroller for receiving the continuous signal and detecting a crash of the motor as a function of the continuous signal.

The controller 16 is typically on-board the motor vehicle 12 and may be dedicated to detecting crashes or may have additional functions, such as controlling airbag deployment.

In one aspect of the present invention, the controller 16 implements a hidden Markov model (or HMM) operating in a continuous mode. As discussed below, the HMM uses continuous observation densities and a probability density function.

In one aspect of the present invention, the continuous signal represents the acceleration of the motor vehicle 12. In the continuous mode HMM, the probabilities are represented by a mean vector, μ, and a covariance matrix, Cov. The mean vector, μ represents the mean value of each state. The covariance matrix, Cov with diagonal elements, represents the variance of each variable and other elements represent covariance of each variable.

Figure 4A:
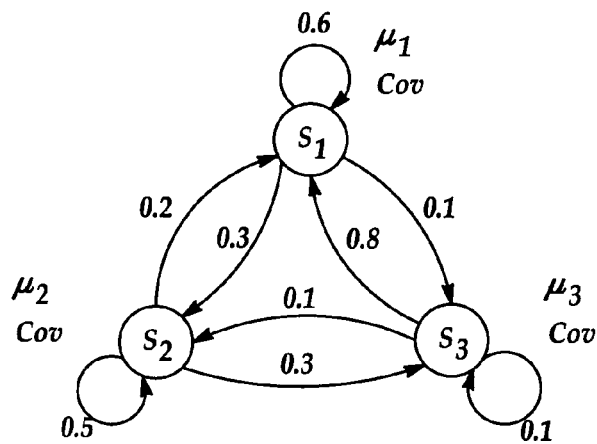
FIG. 4A is a state model of a fully connected 3 state model.

In one aspect of the present invention, the HMM has N states, $S_1, S_2, \ldots$ and $S_N$, where $S_N$ represents a crash. In one embodiment, N equals 3. In another embodiment, N equals 7. The HMM may take different forms. For example, with reference to FIG. 4A, the HMM 20, represented by state diagram 20A, is a fully-connected model, in which each state may transition to any other state or to itself. As shown, each transition to another state or the same state has an associated probability. The probabilities shown in FIG. 4A are for illustrative purposes only. The sum of the probabilities associated with a particular state must add up to 1.0. For example, from state, $S_1$, the probability of transitioning to state, $S_2$, is 0.3, the probability of transitioning to state $S_3$ is 0.1, and the probability of transitioning to state $S_1$ is 0.6. The sum (0.3+0.1+0.6) is 1.0. Each state has an associated mean vector, $\mu_j$, where j represents the associated state. The HMM 20 also has an associated covariance matrix, Cov.

In one embodiment of the present invention, probabilities are expressed as logarithms.

Figure 4B:
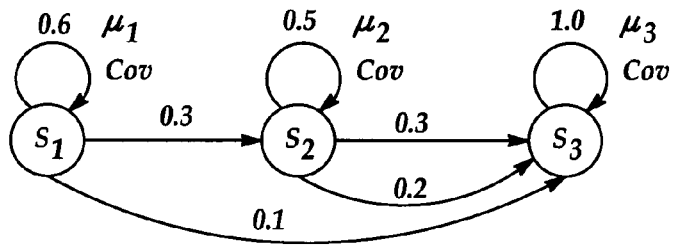
FIG. 4B is a state model of a left-right 3 state model.

With specific reference to FIG. 4B, the HMM 20, represent by state diagram 20B, is a left-right model, in which each state may only transition to a forward state. The illustrated state diagrams show three states for simplicity only. As shown, each transition to another state or the same state has an associated probability. The probabilities shown in FIG. 4B are for illustrative purposes only. The sum of the probabilities associated with a particular state must add up to 1.0. For example, from state, $S_1$, the probability of transitioning to state, $S_2$, is 0.3, the probability of transitioning to state $S_3$ is 0.1, and the probability of transitioning to state $S_1$ is 0.6. The sum (0.3+0.1+0.6) is 1.0. Each state has an associated mean vector, $\mu_j$ where j represents the associated state and n represents the previous state. The HMM 20 also has an associated covariance matrix, Cov.

Crash sensing is a real-time application. Therefore, the HMM is implemented using a simple algorithm. The implement algorithm uses an estimate in determining whether a motor vehicle is in a crash state, i.e., $S_N$.

In one embodiment of the present invention, the continuous signal is composed of a series of pulses. Each pulse has a time element and a value element. For example, two subsequent pulses may be:

{1.7 8.9365} and
{6.1 4.0571}, where each line represents an observation and each column represents a variable the first number is a time index and the second number is the value of the parameter at the time index.

A series of pulses is referred to as a sequence. Sequences resulting in a crash are referred to as crash events. Sequences resulting in a non-crash are referred to as non-crash events. In one embodiment, the estimate is based on the likelihood of crash pulses.

An observation sequence, O, is defined by a series of pulses, $O_1, O_2, \ldots O_T$. A state sequence represents the corresponding states of the motor vehicle 12. A state sequence, Q, is defined by a series of states, $Q_1, Q_2, \ldots Q_T$, where $Q_T$ represents a crash.

The likelihood, or probability, of the observation sequence, O, for the state sequence, Q, may be expressed as $P(O|Q,\lambda)$, for the HMM, λ. The probability of a state sequence, Q, may be expressed as $P(Q|\lambda)$.

The probability of the observation sequence, O, given the HMM, λ, may be expressed as $P(O|\lambda)$ and may be obtained by summing the probability over all possible state sequences. Thus, $P(O|\lambda)$ may be determined using the equation:

$$P(O|\lambda) = \Sigma P(O|Q,\lambda)P(Q|\lambda).$$  EQN. 1

In one aspect of the present invention, to determine the probability efficiently, a forward variable, $\alpha_t(i)$, which may be defined by $$\alpha_t(i) = P(O_1, O_2, \ldots O_t, q_t=S_i|\lambda).$$  EQN. 2

The forward variable, $\alpha_t(i)$, is the probability of the partial observation sequence, $O_1, O_2, \ldots O_t$, and state $S_i$, at time t, given the model, λ. So, the likelihood can be calculated by summing $\alpha_T(i)$ over all possible states:

$$P(O|\lambda) \quad \sum_{i=1}^{N} \alpha_T(i).$$  EQN. 3

In another aspect of the present invention, the hidden Markov model must be trained. In one embodiment, the hidden Markov model is of the form:

λ={A, π, Cov, μ}, where A is a matrix representing transition probabilities between each state, π is a matrix representing the probability of each state for the first observation, Cov is a covariance matrix representing the variance and covariance of each variable, and μ is a mean vector representing the mean value of each state.

The training or learning process is performed using sample acceleration points, i.e., a sample observation sequence. For purposes of illustration only, the learning process is discussed below using a two sample observation sequence or observational matrix, O, where $$O = \begin{bmatrix} 1.7 & 8.9365 \\ 6.1 & 4.0571 \end{bmatrix}.$$  EQN. 4

The first column corresponds to the time at which the acceleration is measured. The second column corresponds to the acceleration value. Generally, all of the time samples will be uniformly spaced, however, they need not be.

Figure 1:
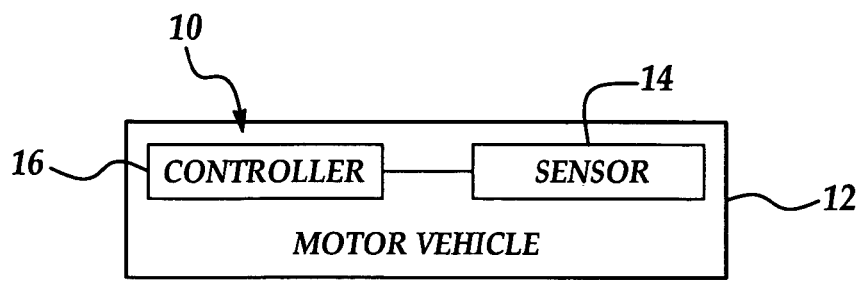
FIG. 1 is a block diagram of a system for detecting collisions or crashes of a motor vehicle, according to an embodiment of the present invention.
Figure 2:
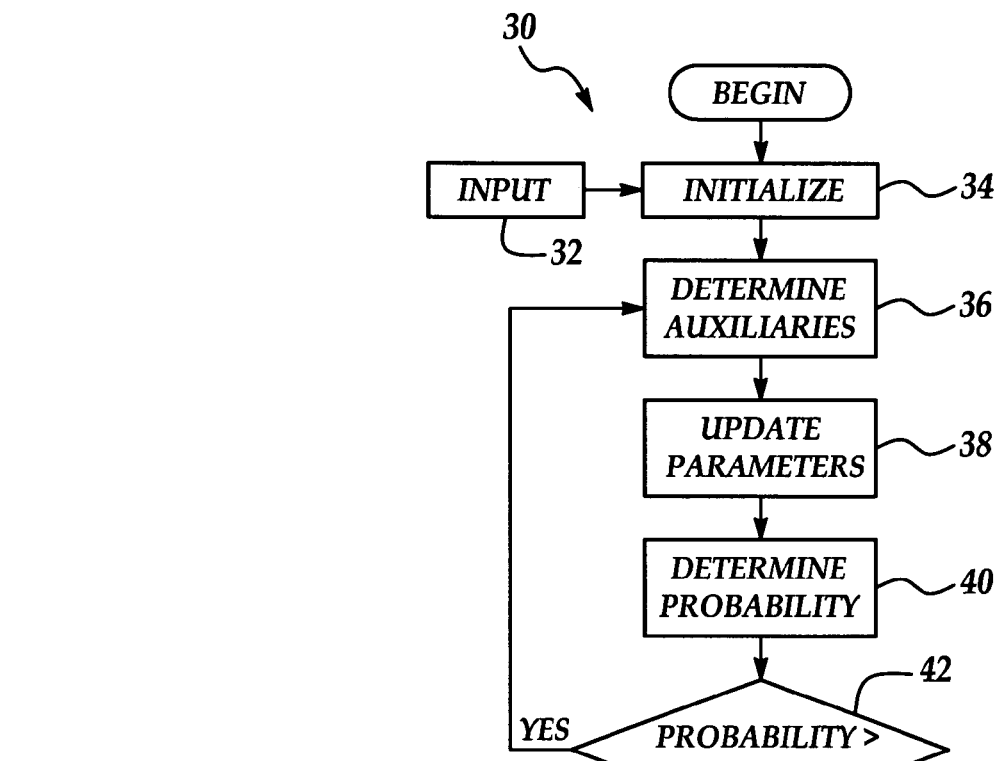
FIG. 2 is a flow diagram of a training method of a Hidden Markov Model operating in a continuous mode used for detecting crashes of a motor vehicle, according to an embodiment of the present invention.
Figure 3:
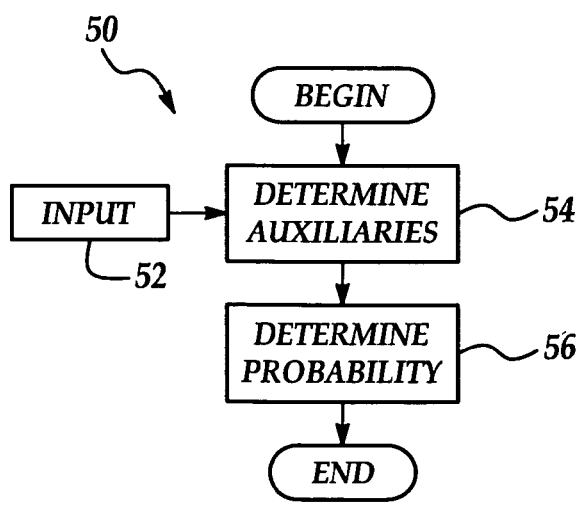
FIG. 3 is a flow diagram of a method for detecting crashes of a motor vehicle using a Hidden Markov Model operating in a continuous mode, according to an embodiment of the present invention.

With reference to FIG. 2, a training method 30 for training the HMM, according to one embodiment of the present invention is shown. The training method 30 may be performed on a separate computer (not shown).

The observational matrix, O, is input to in a first step 32. In a second step 34, the model, λ, is initialized.

In one embodiment, the model, λ, is initialized with random numbers.

The observational matrix, O, may be partitioned into two single column matrices for computing the covariance. This $O = [O^{Time} | O^{Acceleration}]$.

In another embodiment, the model, λ, is initialized using the equations below.

$$\mu = \begin{bmatrix} \sigma(O^{Time}) + \overline{O^{Time}} & \overline{O^{Acceleration}} \\ \overline{O^{Time}} & \sigma(O^{Acceleration}) + \overline{O^{Acceleration}} \end{bmatrix}, \quad \text{EQN. 5}$$

and $$Cov = \begin{bmatrix} \sigma^2(O^{Time}) & 0 \\ 0 & \sigma^2(O^{Acceleration}) \end{bmatrix}, \quad \text{EQN. 6}$$

where $\sigma$ is standard deviation.

In one embodiment, a set of auxiliaries matrices, $\gamma$ and $\xi$. In a third step 34, the auxiliary matrices are initialized using the equations below.

$$b_j(\vec{O}) = \begin{pmatrix} Pr(\vec{O}_1 \mid S_1) & \cdots & Pr(\vec{O}_1 \mid S_n) \\ \vdots & \ddots & \vdots \\ Pr(\vec{O}_k \mid S_1) & \cdots & Pr(\vec{O}_k \mid S_n) \end{pmatrix},$$

where $$b_j(x) = \frac{1}{(2\pi)^{\frac{n}{2}} \sqrt{|Cov_j|}} \exp\left(-\frac{(x-\mu_j)'Cov_j^{-1}(x-\mu_j)}{2}\right), \quad \text{EQN. 7}$$

The matrices $\alpha$, $\beta$, $\gamma$, $\xi$, all have T rows and N columns corresponding to samples, t=1, 2, . . . T and states $S_1$, $S_2$, . . . $S_n$. For example, $\alpha$ is of the form:

$$\begin{matrix} t=t_1 \\ \cdots \\ t=t_T \end{matrix} = \begin{pmatrix} \alpha_{t_1}(S_1) & \cdots & \alpha_{t_1}(S_n) \\ \vdots & \ddots & \vdots \\ \alpha_{t_T}(S_1) & \cdots & \alpha_{t_T}(S_n) \end{pmatrix},$$

where each $\alpha_t(j)$ is computed as follows:

$$\begin{cases} \alpha_1(j) = \pi_j b_j(O_1) & 1 \leq j \leq N \\ \alpha_{t+1}(j) = \left[\sum_{i=1}^{N} \alpha_t(i) a_{ij}\right] b_j(O_{t+1}) & \begin{array}{l} 1 \leq t \leq T-1 \\ 1 \leq j \leq N \end{array} \end{cases} \quad \text{EQN. 9}$$

Similarly, the other matrixes $\beta$, $\gamma$, and $\xi$, are computed as follows:

$$\begin{cases} \beta_T(i) = 1 & 1 \leq i \leq N \\ \beta_t(i) = \sum_{j=1}^{N} a_{ij} \beta_j(O_{t+1})(\beta_{t+1}(j) & \begin{array}{l} t = T-1, T-2, \ldots 1 \\ 1 \leq i \leq N \end{array} \end{cases} \quad \text{EQN. 10}$$

$$\gamma_t(i) = \frac{\alpha_t(i)\beta_t(i)}{\sum_{i=1}^{N} \alpha_t(i)\beta_t(i)} \quad \text{EQN. 11}$$

$$\xi_t(i,j) = \frac{\alpha_t(i) a_{ij} b_j(O_{t+1}) \beta_{t+1}(j)}{\sum_{i=1}^{N} \sum_{j=1}^{N} \alpha_t(i) a_{ij} b_j(O_{t+1}) \beta_{t+1}(j)} \quad \text{EQN. 12}$$

In a fourth step 38, the parameters of the HMM are updated with the above auxiliary matrices using the following equations:

$$\bar{\pi}_j = \gamma_1(j), \quad \text{EQN. 13}$$

$$\bar{a}_{ij} = \frac{\sum_{t=1}^{T-1} \xi_t(i,j)}{\sum_{t=1}^{T-1} \gamma_t(i)}, \quad \text{EQN. 14}$$

$$\bar{\mu}_j = \frac{\sum_{t=1}^{T} \gamma_t(j) \cdot (O_t)}{\sum_{t=1}^{T} \gamma_t(j)}, \text{ and} \quad \text{EQN. 15}$$

$$\overline{Cov}_j = \frac{\sum_{t=1}^{T} \gamma_t(j) \cdot (O_t - \mu_j)(O_t - \mu_j)'}{\sum_{t=1}^{T} \gamma_t(j)},$$

where "A·B" represents the dot product of vectors A and B. EQN. 16

In a fifth step 40, the probability of the observation sequence is then determined using the HMM and the equation:

$$P(O \mid \lambda) = \log\left(\sum_{i=1}^{N} \alpha_T(i)\right) \quad \text{EQN. 17}$$

In a first decision block 42, the determined probability is compared with a previous value. In one embodiment, the previous value is initialized to $\infty$. If the determined probability is greater than the previous value, then the method 30 returns to the third step 36.

With reference to 3, a method 50 for detecting a crash is determined. In a first step 52, an observation sequence, O, is input to the method 50. In a second step 54, the auxiliary matrices are determined for the given observation sequence, O, are determined using the equations above. In a third step 56, the probability of a crash occurring is determined.

In one embodiment, the probability, P(O|Q,$\lambda$), is determined using the following equations:

$$P(O \mid \lambda) = \sum_{all\, Q} P(O \mid Q, \lambda) P(Q \mid \lambda), \quad \text{EQN. 18}$$

$$P(O \mid \lambda) = \sum_{all\, Q} \pi_{q_1} b_{q_1}(O_1) a_{q_1 q_2} b_{q_2}(O_2) \ldots a_{q_{T-1} q_T} b_{q_T}(O_T), \quad \text{EQN. 20}$$

where $a_{q_1 q_2}\, a_{q_2 q_3}\, \ldots\, a_{q_{T-1} q_T}$ are predetermined constants.

$$P(O \mid Q, \lambda) = \prod_{t=1}^{T} P(O_t \mid q_t) \quad \text{EQN. 21}$$

$$= b_{q_1}(O_1) b_{q_2}(O_2) \ldots b_{q_T}(O_T), \quad \text{EQN. 22}$$

where $b_{q_1}, b_{q_2}, \ldots b_{q_T}$ are predetermined constants, $$P(Q \mid \lambda) = \pi_{q_1} a_{q_1 q_2} a_{q_2 q_3} \ldots a_{q_{T-1} q_T} \quad \text{EQN. 23}$$

where, $a_{q_1 q_2}, a_{q_2 q_3}, \ldots a_{q_{T-1} q_T}$ are predetermined constants.

Using the forward variable, $\alpha_T(i)$, described above, the likelihood or probability can by determined by summarizing $\alpha_T(i)$ over all possible states using EQN 17.

$$P(O \mid \lambda) = \sum_{all\,Q} \pi_{q_1} b_{q_1}(O_1) a_{q_1 q_2} b_{q_2}(O_2) \ldots a_{q_{T-1} q_2} b_{q_T}(O_T), \quad \text{EQN. 24}$$

where $a_{q_1 q_2}, \ldots a_{q_{T-1} q_2}$ are predetermined constants.

In one embodiment, the probability associated with observation sequence, O, and state sequence, Q, is compared with a predetermined value. If the probability is greater than the predetermined value, then a crash is detected.

In experimental simulations, the time required to train and test a HMM operating in a discrete mode was compare with the time required to train and test a HMM in a continuous mode. Data sets of 100×50 were used to train both models and data sets of 100×100 were used to test the models. The time required to train the discrete HMM was 54.869 seconds and the time required to train the continuous HMM was 59.255. These time values are within 10% of each other. However, the time required to run the testing observation sequence through the continuous mode HMM was only 5.148 seconds compared with a time of 39.546 seconds for the discrete model.

When solving data mining problems, the available data is typically dividing into a training set and an evaluation set. If there is insufficient data, validation techniques may be used to provide statistically sound results using the minimal data set. One such technique is known as cross validation. Cross validation is a heuristic process that works as follows:

1. Divide the available data in to a training set and an evaluation set.
2. Split the training data into n folds, each fold containing the approximately same number of patterns.
3. Select an architecture, e.g., state model, number of states, buffer size, and training parameters.
4. Use n−1 folds to train the model and a different fold for testing.
5. Repeat steps 2–4 using different architectures and training parameters.
6. Select the best model and train it using all data in the training set.
7. Access the final model using the evaluation data set.

If n equals the number of patterns in the data set, the validation technique is known as "Jack-knifing" cross validation.

Figure 5:
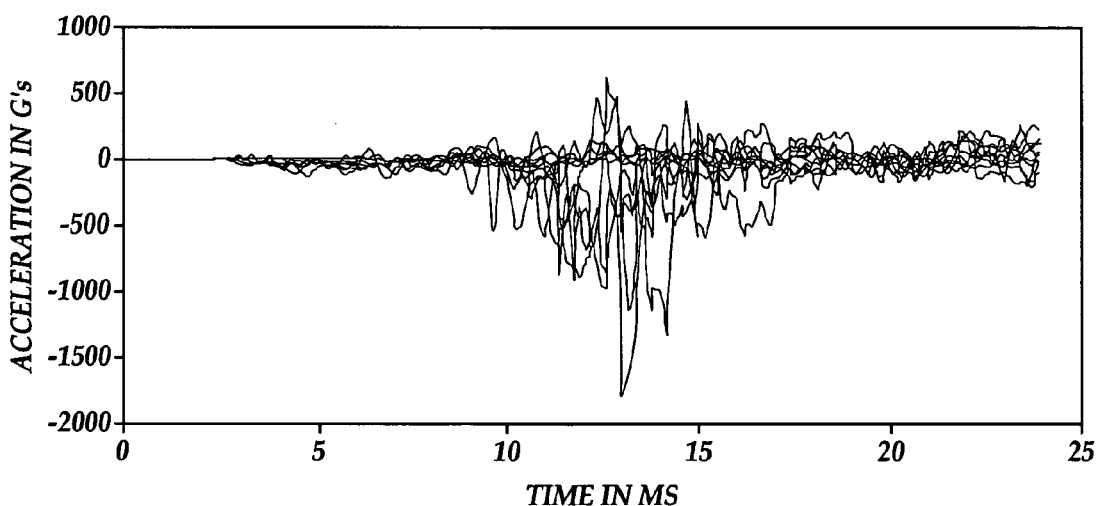
FIG. 5 is a graph illustrating 10 sample crash pulses.

Using 15 actual crash pulses (sequences), i.e., observation sequences of actual crash data, the above cross-validation process was performed. Two thirds of the crash pulses, i.e., 10, were used as training data and one third, or 5, were used as evaluation data. The ten training pulses represent different crashes with parameters as indicated below and are shown in FIG. 5:

First Training pulse 60: 35 mph/flat front/rigid barrier,
Second Training Pulse 62: 35 mph/flat front/rigid barrier,
Third Training Pulse 64: 35 mph/flat front/rigid barrier,
Fourth Training Pulse 66: 35 mph/90 degree frontal/fixed barrier,
Fifth Training Pulse 68: 35 mph/90 degree frontal/fixed barrier,
Sixth Training Pulse 70: 35 mph/90 degree frontal/fixed barrier,
Seventh Training Pulse 72: 40 mph/offset/deformable barrier,
Eighth Training Pulse 74: 30 degree/frontal oblique/fixed barrier,
Ninth Training Pulse 76: 30 degree/frontal oblique/fixed barrier, and
Tenth Training Pulse 78: 30 degree/frontal oblique/fixed barrier.

Figure 6A:
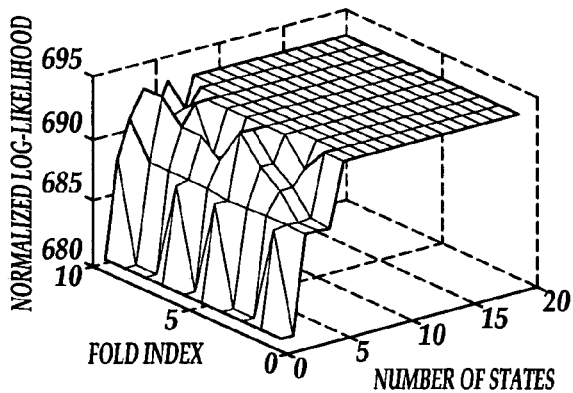
FIG. 6A is a graph illustrating the normalized log-likelihood of a fully connected Hidden Markov Model with respect to different number of states, according to an embodiment of the present invention.
Figure 6B:
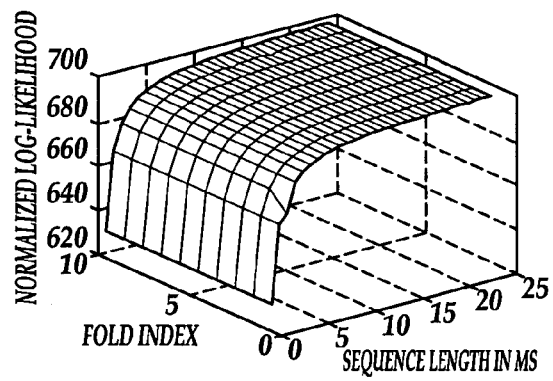
FIG. 6B is a graph illustrating the normalized log-likelihood of a fully connected Hidden Markov Model with respect to different sequence lengths, according to an embodiment of the present invention.

The graphs of FIGS. 6A and 6B illustrate LL(N,F) and LL(L,F), respectively, of the ten training pulses 60–78 for a fully connected HMM, where LL is the normalized log-likelihood, N is the number of states of the HMM, F is the fold index, and L is the sequence length. From FIG. 6, it can be concluded that when the number of states $\geq 8$ and $L \geq 5$ milliseconds, all of the folds show great consistency for a fully-connected model.

Figure 7A:
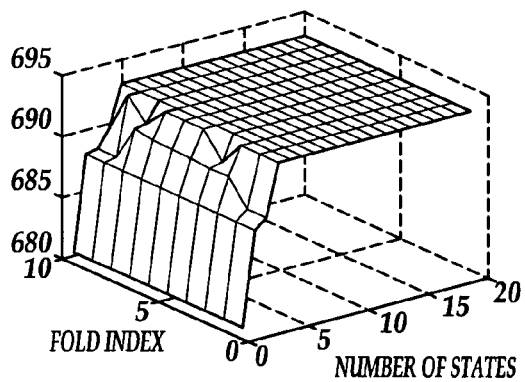
FIG. 7A is a graph illustrating the normalized log-likelihood of a left-right Hidden Markov Model with respect to different number of states, according to an embodiment of the present invention; and, FIG. 7B is a graph illustrating the normalized log-likelihood of a left-right Hidden Markov Model with respect to different sequence lengths, according to an embodiment of the present invention.
Figure 7B:
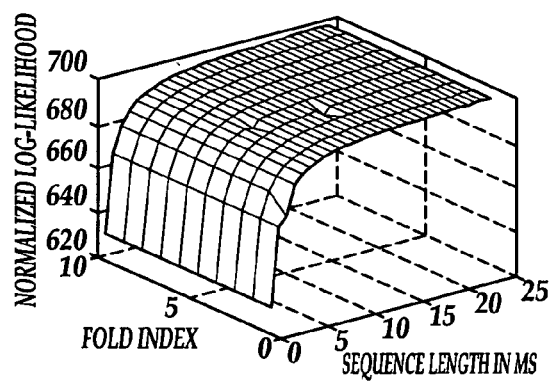

The graphs of FIGS. 7A and 7B illustrate LL(N,F) and LL(L,F), respectively, of the ten training pulses 60–78 for a left-right connected HMM, where LL is the normalized log-likelihood, N is the number of states of the HMM, F is the fold index, and L is the sequence length. From FIG. 6, it can be concluded that when the number of states $\geq 7$ and $L \geq 5$ milliseconds, all of the folds show great consistency for a left-right connected model, i.e., increasing the number of states or the buffer size will not result in significant performance gains.

Based on the above results, a left-right HMM with seven state operating in a continuous mode was training using all of the 10 crash pulses (see above). The five remaining pulses were used to evaluate the model The left-right HMM was simulated using the Matlab Simulink simulation software available from MathWorks of Natick, Mass. A buffer size of 6 milliseconds was used.

With reference to FIG. 8, the five evaluation pulses were used and the crash was detected at the listed detection time
First Evaluation Pulse 80 (30 mph): 5.52 milliseconds,
Second Evaluation Pulse 82 (35 mph): 4.32 milliseconds,
Third Evaluation Pulse 84 (19 mph): 7.20 milliseconds,
Fourth Evaluation Pulse 86 (22 mph): 7.84 milliseconds, and
Fifth Evaluation Pulse 88 (42 mph): 6.20 milliseconds.

Obviously, many modifications and variations of the present invention are possible in light of the above teachings. The invention may be practiced otherwise than as specifically described within the scope of the appended claims.

What is claimed is:

1. A system for detecting a crash of a motor vehicle, comprising:
at least one sensor for sensing a parameter of the motor vehicle and generating a continuous signal as a function of the sensed parameter;
a controller for implementing a hidden Markov model operating in a continuous mode, for receiving the continuous signal and detecting a crash of the motor as a function of the continuous signal and the hidden Markov model.

2. A system, as set forth in claim 1, wherein the hidden Markov model is an N-state fully-connected model.

3. A system, as set forth in claim 2, wherein the hidden Markov model is a N-state left-right model.

4. A system, as set forth in claim 1, wherein the parameter is acceleration.

5. A system, as set forth in claim 1, wherein the hidden Markov model is of the form: $\lambda=\{A, \pi, Cov, \mu\}$, where A is a matrix representing transition probabilities between each state, $\pi$ is a matrix representing the probability of each state for the first observation, Cov is a covariance matrix representing the variance and covariance of each variable, and $\mu$ is a mean vector representing the mean value of each state.

6. A system, as set forth in claim 5, wherein the continuous signal is represented by an observation sequence, $O=O_1O_2 \ldots O_T$, the hidden Markov model has N states, and a state sequence is represented by $Q=q_1 q_2 \ldots q_T$.

7. A system, as set forth in claim 6, wherein QT, in the state sequence, Q, represents a crash, and a probability associated with the observation sequence, O, is determined as a sum of a probability associated with each possible state sequences which lead to Q.

8. A system, as set forth in claim 7, wherein the probability associated with the observation, O, is determined using the equation:

$$P(O \mid \lambda) = \sum_{all\ Q} P(O \mid Q, \lambda) P(Q \mid \lambda),$$

where $P(O|Q,\lambda)$ is the probability of the observation sequence, O, for the state sequence, Q, and $P(Q|\lambda)$ is the probability of the state sequence.

9. A system, as set forth in claim 8, wherein $P(O|Q,\lambda)$ is determined by the equation:

$$P(O \mid Q, \lambda) = \prod_{t=1}^{T} P(O_t \mid q_t, \lambda)$$
$$= b_{q_1}(O_1) b_{q_2}(O_2) \ldots b_{q_T}(O_T), \text{ where } b_{q_i}(o_i) \text{ is}$$
conditional probability of the observation, $O_i$,
given the hidden state, $q_i$.

10. A system, as set forth in claim 9, where $P(Q|\lambda)$ is determined by the equations:

$P(Q|\lambda)=\pi_{q_1} a_{q_1 q_2} a_{q_2 q_3} \ldots a_{q_{T-1} q_T}$, where $a_{q_i q_j}$ is transition probability from state, $q_i$ to state, $q_j$.

11. A system, as set forth in claim 10, wherein $P(O|\lambda)$ is determined by the equation:

$P(O|\lambda)=\Sigma \pi_{q_1} b_{q_1}(O_1) a_{q_1 q_2} b_{q_2}(O_2) \ldots a_{q_{T-1} q_T}(O_T)$.

12. A system, as set forth in claim 7, wherein the probability associated with the observation sequence, O, is determined as a function of a forward variable ($\alpha_t(i)$), the forward variable ($\alpha_t(i)$) is determined using the equation:

$\alpha_t(i)=P(O_1 O_2 \ldots O_t q_t=S_i|\lambda)$.

13. A system, as set forth in claim 12, wherein the probability associated with the observation, O, is determined using the equation:

$$P(O \mid \lambda) = \sum_{i=1}^{N} \alpha_T(i),$$

where $P(O|Q,\lambda)$ is the probability of the observation sequence, O, for the state sequence, Q, and $P(Q|\lambda)$ is the probability of the state sequence.

14. A system, as set forth in claim 7, wherein the crash is detected if the probability associated with the observation sequence is greater than a predetermined value.

15. A system, as set forth in claim 7, wherein the probability associated with the observation sequence is expressed in terms of a logarithm.

16. A method for detecting a crash of a motor vehicle, comprising:
sensing a parameter of the motor vehicle and generating a continuous signal as a function of the sensed parameter; and,
receiving the continuous signal and detecting a crash of the motor as a function of the continuous signal and a hidden Markov model operating in a continuous mode.

17. A method, as set forth in claim 16, wherein the hidden Markov model is an N-state fully-connected model.

18. A method, as set forth in claim 17, wherein the hidden Markov model is a N-state left-right model.

19. A method, as set forth in claim 16, wherein the parameter is acceleration.

20. A method, as set forth in claim 16, wherein the hidden Markov model is of the form: $\lambda=\{A, \pi, Cov, \mu\}$, where A is a matrix representing transition probabilities between each state, $\pi$ is a matrix representing the probability of each state for the first observation, Cov is a covariance matrix representing the variance and covariance of each variable, and $\mu$ is a mean vector representing the mean value of each state.

21. A method, as set forth in claim 20, wherein the continuous signal is represented by an observation sequence, $O=O_1O_2 \ldots O_T$, the hidden Markov model has N states, and a state sequence is represented by $Q=q_1 q_2 \ldots q_T$.

22. A method, as set forth in claim 21, wherein $Q_T$, in the state sequence, Q, represents a crash, and a probability associated with the observation sequence, O, is determined as a sum of a probability associated with each possible state sequences which lead to Q.

23. A method, as set forth in claim 22, wherein the probability associated with the observation, O, is determined using the equation:

$$P(O \mid \lambda) = \sum_{all\ Q} P(O \mid Q, \lambda) P(Q \mid \lambda),$$

where $P(O|Q,\lambda)$ is the probability of the observation sequence, O, for the state sequence, Q, and $P(Q|\lambda)$ is the probability of the state sequence.

24. A method, as set forth in claim 23, wherein $P(O|Q,\lambda)$ is determined by the equation:

$$P(O \mid Q, \lambda) = \prod_{t=1}^{T} P(O_t \mid q_t, \lambda)$$
$$= b_{q_1}(O_1) b_{q_2}(O_2) \ldots b_{q_T}(O_T), \text{ where } b_{q_i}(o_i) \text{ is}$$

-continued conditional probability of the observation, $O_i$, given the hidden state, $q_i$.

25. A method, as set forth in claim 24, where P(Q|λ), is determined by the equations:

$P(Q|\lambda) = \pi_{q_1} a_{q_1 q_2} a_{q_2 q_3} \ldots a_{q_{T-1} q_T}$, where $a_{q_i q_j}$ is transition probability from state, $q_i$ to state, $q_j$.

26. A method, as set forth in claim 25, wherein P(O|λ), is determined by the equation:

$P(O|\lambda) = \Sigma \pi_{q_1} b_{q_1}(O_1) a_{q_1 q_2} b_{q_2}(O_2) \ldots a_{q_{T-1} q_T}(O_T)$ 27. A method, as set forth in claim 22, wherein the probability associated with the observation sequence, O, is determined as a function of a forward variable ($\alpha_t(i)$), the forward variable ($\alpha_t(i)$) is determined using the equation:

$\alpha_t(i) = P(O_1 O_2 \ldots O_t, q_t = S_i | \lambda)$.

28. A method, as set forth in claim 27, wherein the probability associated with the observation, O, is determined using the equation:

$$P(O|\lambda) = \sum_{i=1}^{N} \alpha_T(i),$$

where P(O|Q,λ) is the probability of the observation sequence, O, for the state sequence, Q, and P(Q|λ) is the probability of the state sequence.

29. A method, as set forth in claim 22, wherein the crash is detected if the probability associated with the observation sequence is greater than a predetermined value.

30. A method, as set forth in claim 22, wherein the probability associated with the observation sequence is expressed in terms of a logarithm.

* * * * *

UNITED STATES PATENT AND TRADEMARK OFFICE
CERTIFICATE OF CORRECTION

| | | |
|---|---|---|
| PATENT NO. | : 7,113,079 B2 | Page 1 of 1 |
| APPLICATION NO. | : 10/958028 | |
| DATED | : September 26, 2006 | |
| INVENTOR(S) | : Gautam B. Singh and Haiping Song | |

It is certified that error appears in the above-identified patent and that said Letters Patent is hereby corrected as shown below:

Column 9, Line, 58, Claim 11, please insert --$b_{qT}$-- between "$a_{qT}$-1 $_{qT}$" and "$(O_T)$".

Signed and Sealed this

Nineteenth Day of December, 2006

JON W. DUDAS
*Director of the United States Patent and Trademark Office*